United States Patent
Chang et al.

(10) Patent No.: US 6,352,658 B1
(45) Date of Patent: Mar. 5, 2002

(54) METHOD FOR PRODUCING DECORATIVE COMPONENTS HAVING AN OUTER ELASTOMERIC LAYER THAT IS INTEGRAL WITH AN INNER FOAM LAYER

(75) Inventors: L. Patrick Chang, Flat Rock; Jon Pavlinac, South Lyon; Joseph Ogonowski, Newport; Richard P. Harrison, Lincoln Park, all of MI (US)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 09/475,788

(22) Filed: Dec. 30, 1999

(51) Int. Cl.[7] ................................. B29C 44/06
(52) U.S. Cl. ................ 264/46.4; 264/45.1; 264/255; 264/309
(58) Field of Search ................ 264/46.4, 46.6, 264/255, 309, 45.1, 45.5; 428/318.6

(56) References Cited

U.S. PATENT DOCUMENTS

| | | | |
|---|---|---|---|
| 4,251,476 A | * 2/1981 | Smith ................... | 264/46.6 |
| 4,255,367 A | * 3/1981 | Wallace et al. ........ | 264/45.1 |
| 4,440,705 A | * 4/1984 | Nissen et al. ......... | 264/53 |
| 4,559,366 A | * 12/1985 | Hostetler .............. | 264/45.5 |
| 4,590,219 A | * 5/1986 | Nissen et al. ........ | 264/45.5 |
| 4,855,096 A | * 8/1989 | Panaroni .............. | 264/45.5 |
| 4,940,558 A | 7/1990 | Jarboe et al. ......... | 264/46.7 |
| 4,956,133 A | * 9/1990 | Payne ................. | 264/45.5 |
| 5,028,006 A | 7/1991 | De Winter et al. ..... | 239/399 |
| 5,071,683 A | 12/1991 | Verwilst et al. ....... | 427/420 |
| 5,082,609 A | 1/1992 | Rohrlach et al. ...... | 264/46.4 |
| 5,116,557 A | 5/1992 | Debaes et al. ....... | 264/46.6 |
| 5,143,941 A | * 9/1992 | Rossio et al. ........ | 264/45.5 |
| 5,284,880 A | * 2/1994 | Harrison et al. ....... | 264/45.5 |
| 5,300,532 A | * 4/1994 | Takimoto et al. ...... | 264/45.5 |
| 5,389,317 A | 2/1995 | Grimmer .............. | 264/46.5 |
| 5,437,822 A | * 8/1995 | Wada et al. ........... | 264/45.5 |
| 5,580,501 A | * 12/1996 | Gallagher et al. ..... | 264/255 |
| 5,611,976 A | * 3/1997 | Klier et al. ........... | 264/331.19 |
| 5,662,996 A | 9/1997 | Jourquin et al. ....... | 428/318.8 |
| 5,665,288 A | * 9/1997 | Narayan et al. ....... | 264/53 |
| 5,885,662 A | 3/1999 | Gardner, Jr. .......... | 427/426 |
| 5,911,927 A | * 6/1999 | Roberts ............... | 264/255 |

FOREIGN PATENT DOCUMENTS

| | | | |
|---|---|---|---|
| BE | WO 9323237 | 11/1993 | |
| JP | 63-109016 | * 5/1988 | ............ 264/309 |

* cited by examiner

Primary Examiner—Allan R. Kuhns
(74) Attorney, Agent, or Firm—Fernando A. Borrego

(57) ABSTRACT

The method of the present invention is particularly suited for making decorative objects in a mold cavity. The method enables one to form a decorative component having an outer elastomeric layer that is integral with an inner layer of foam. Because the chemical formulation for the outer layer and the inner layer is identical, other than the inner layer includes a foaming agent, the decorative component does not suffer from the drawbacks of the previous methods such as, for example, poor adhesion between the elastomeric layer and the foam layer causing delamination of the two layers, sinks or holes in the foam layer leading to imperfections in the elastomeric layer, and bleed through to the elastomeric layer from the foam layer. The method permits the mold to be pre-coated with an in-mold paint prior to the molding process. Coatings can also be applied after demolding the resulting part.

21 Claims, 4 Drawing Sheets

METHOD FOR PRODUCING DECORATIVE COMPONENTS HAVING AN OUTER ELASTOMERIC LAYER THAT IS INTEGRAL WITH AN INNER FOAM LAYER

BACKGROUND OF THE INVENTION

The present invention relates to a method for making decorative components and, more particularly, to a method for making molded decorative components having an outer elastomeric layer that is integral with an inner foam layer.

A recent trend in the automobile industry has been the development of various non-fabric automotive trim components having an elastomeric outer skin a flexible foam layer and a substrate. Among the known systems for producing decorative components are polyvinyl chloride (PVC) vacuum and rotocast systems, thermoplastic polyolefin (TPO) vacuum formed systems, thermoplastic polyurethane (TPU) rotocast systems, slush molding systems, and sprayed aliphatic urethane systems generally. However, each of the foregoing systems present certain perceived drawbacks. One drawback with all of the systems is that generally the elastomeric skin layer needs to be formed in one mold and then it has to be demolded and put into another mold for the foaming step and attachment of the substrate.

The known PVC vacuum form and rotocast systems are also undesirable because PVC is difficult to recycle and environmentally unfriendly, i.e., subject to releasing dioxins and other chlorinated by-products upon decomposition. Further, an unnecessarily thick skin is required to minimize the effects of plasticizer loss over time. PVC skins, particularly those which are vacuum formed, are often stiff and have a poor feel. Also PVC skins are prone to leaching of components into the foam backing layer.

TPO vacuum formed systems are also often stiff and have a poor feel. Further, the grain definition of the resultant components are considered to be poor in quality. Additionally, TPO skins must often be coated to improve their resistance to scratch and mar resulting in increased costs and labor.

Accordingly, U.S. Pat. No. 5,116,577 to Dabaes et al. attempted to address some of the aforementioned drawbacks seen in PVC and TPO systems, as well as certain integral skin applications by developing a method for manufacturing mold components having a relatively low density, i.e., less than 700 g/dm³. The method is said to involve applying a layer of light stable polyurethane elastomer having a pre-determined color onto a mold surface by spraying and allowing it to partially cure. Thereafter, while the elastomer is still tacky, a synthetic foam composition is injected into the space of the mold cavity. Upon curing of both the elastomer layer and the synthetic foam layer, the resultant object is removed from the mold. The method of Dabaes still includes several drawbacks. For example, the disclosed use of a light stable aliphatic polyurethane elastomer for the external layer of the object is believed to greatly increase the cost of the resulting component. Additionally, the use of different chemicals for the external and foam layers necessitates the use of separate polyurethane metering machines and chemical tanks resulting in significant expense. Further, the resulting disclosed elastomer often requires additional treatment to achieve adhesion to a urethane foam. Other perceived drawbacks include poor color matching with other components, poor fogging resistance, and poor feel due to the relatively thick skins that are typically achieved in practice of the method.

It is desirable to address the leaching of materials between the layers and reduce the cost of the process by providing a method for forming a decorative component having an outer elastomeric layer that is integral with an inner foam layer wherein the elastomeric layer and the foam layer are chemically identical except for the inclusion of a blowing agent in the foam layer. It is also desirable to reduce the cost by eliminating the need to demold the elastomeric layer prior to foaming another layer behind it.

SUMMARY OF THE INVENTION

The present invention provides a method for making decorative components and, more particularly, provides a method for making molded decorative components having an outer elastomeric layer that is integral with an inner foam layer.

In one embodiment the method for forming a decorative component having an outer elastomeric layer that is integral with an inner foam layer, comprises the following steps. Forming a polyurethane mixture free of any blowing agents by combining a flow of a polyisocyanate component with a flow of a polyol component, the polyurethane mixture having a first amount of the polyisocyanate component and a first amount of the polyol component. Applying a layer of the polyurethane mixture onto a surface of a mold by flowing the polyurethane mixture through a spray nozzle directed toward the mold surface and forming an outer elastomeric layer on the mold surface. Forming a polyurethane mixture containing blowing agent by introducing a flow of water into the flow of the polyurethane mixture and changing the first amount of the polyisocyanate component to a second amount, wherein the second amount of the polyisocyanate component is greater than the first amount of the polyisocyanate component, while continuing to spray the polyurethane mixture. Directing the polyurethane mixture containing blowing agent toward the outer elastomeric layer, thereby foaming the polyurethane mixture containing blowing agent and forming an inner foam layer that is integral with the outer elastomeric layer. The decorative component is then demolded. The present invention results in a significant cost savings by eliminating the need to transfer the outer elastomeric layer to a second mold prior to introduction of the foam layer.

In a preferred embodiment the water is introduced at a flow rate that establishes a water level of between 0.3 to 3.0 percent by weight based on the total weight in the polyurethane mixture containing blowing agent.

Additional benefits and advantages of the present invention will become apparent from a reading of the description of the preferred embodiments taken in conjunction with the specific examples provided.

DETAILED DESCRIPTION OF THE INVENTION

Figure 1:
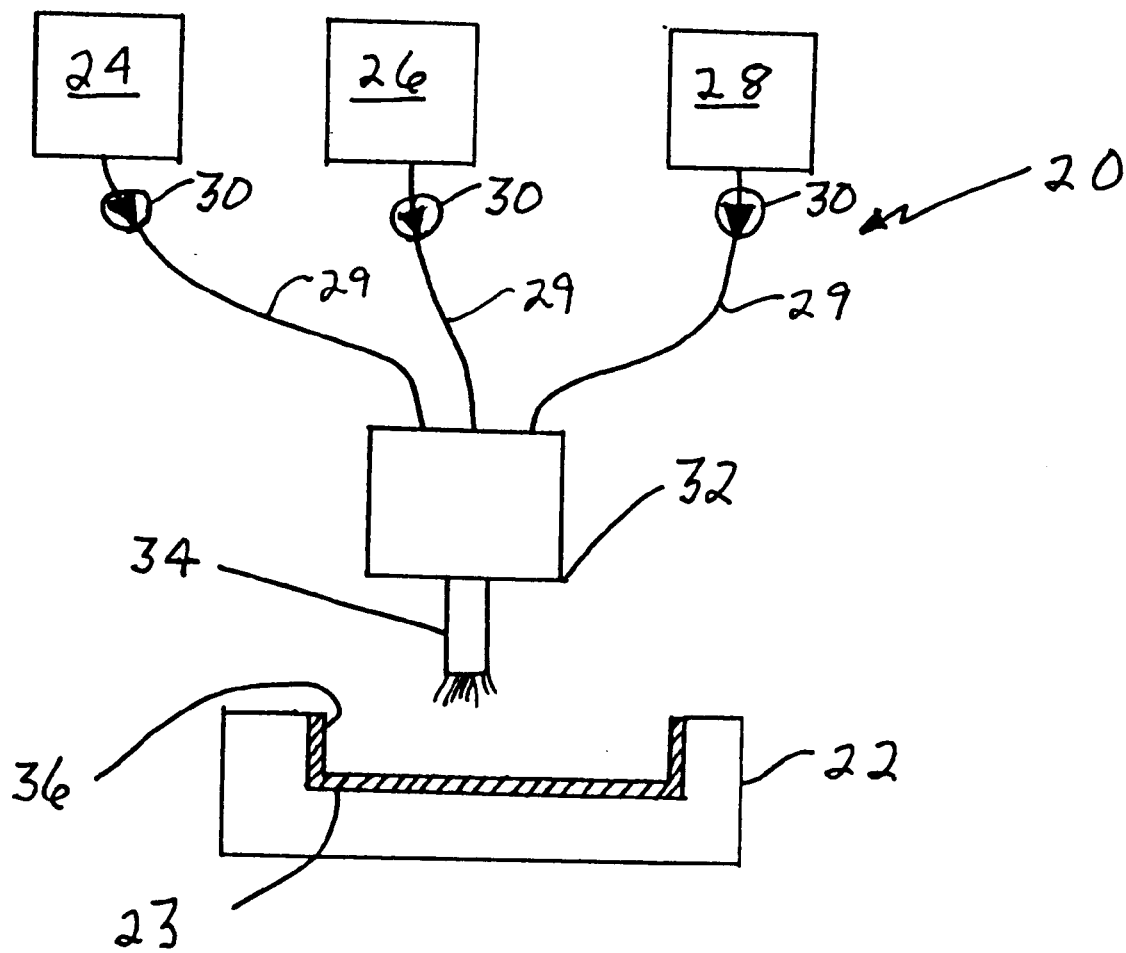
FIG. 1 is a partial cross-sectional side view of a mold and a spray assembly designed in accordance with the present invention.

In FIG. 1 a schematic diagram of a spray assembly is generally shown at 20 suspended over a mold 22. For simplicity, the top of the mold 22 is not shown. The mold 22 has at least one mold surface 23 having the desired contour of a decorative component 42 (See FIG. 4). Spray assembly 20 includes a blowing agent component tank 24 containing a blowing agent, a polyol component tank 26 containing a polyol component and a polyisocyanate component tank 28 containing a polyisocyanate component. Each of the tanks 24–28 includes a feed line 29 having a pump 30. The pumps 30 pump their respective component through feedlines 29 to a mixer 32. Mixer 32 may be an impingement mixer or a static mixer or a combination of both. A spray nozzle 34 extends from the mixer 32. Both mixer 32 and spray nozzle 34 are freely movable relative to the surface 23 so that the spray nozzle 34 can be directed toward any portion of the surface 23. Preferably the movement of spray nozzle 34 is computer controlled as is known in the art. Computer control allows for precise thickness control of any sprayed layer from nozzle 34. In FIG. 1 spray nozzle 34 is shown spraying a polyurethane mixture without blowing agent against surface 23 to form an outer elastomeric layer 36. The polyurethane mixture without blowing agent is formed by using pumps 30 to combine a flow from the polyisocyanate component tank 28 with a flow from the polyol component tank 26 with out blowing agent. The ratio of polyisocyanate component to polyol component is controlled by the rate of their individual flows so as to achieve the desired reactivity, finished part properties and/or adhesion to an in-mold coating layer as described below. Depending largely on the intended use of the resulting decorative object 42, the thickness of the outer elastomeric layer 36 is between about 0.2 and 3.0 mm and preferably between about 0.3 mm and 1.2 mm. Further, the elastomeric layer 36 will preferably have a density of less than 1050 kg/m$^3$, a Shore A durometer hardness of less than 80, a tensile strength of greater than 8.8 MPa.s and a tear strength of greater than 40 kN/m.

Figure 2:
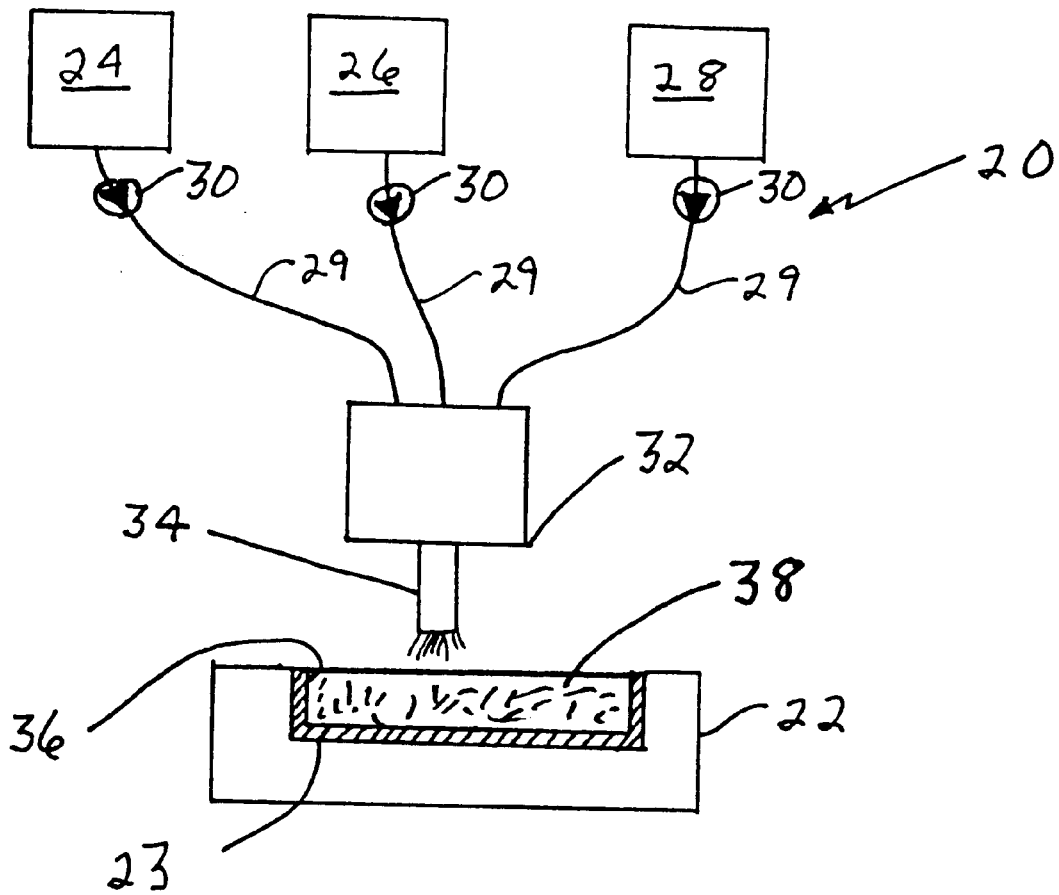
FIG. 2 is a partial cross-sectional side view of the mold after application of an elastomeric layer and a foam layer.

In FIG. 2 the second general step of the method is shown. After the desired thickness of outer elastomeric layer 36 has been formed, the blowing agent component from tank 24 is introduced to the mixer 32 to begin forming a polyurethane mixture having a blowing agent, the pumps 30 for the polyisocyanate component tank 28 and the polyol component tank 26 continue to deliver their respective components. Generally, it is necessary to increase the flow rate of the pump 30 for the polyisocyanate component tank 28 as the blowing agent is added to supply the necessary level of isocyanate. By adding the blowing agent the polyurethane mixture now forms an inner foam layer 38 that is integral with the outer elastomeric layer 36. Because the inner foam layer 38 and the outer elastomeric layer 36 are chemically identical, other than the blowing agent, the elastomeric layer 36 is truly integral with the foam layer 38. This system provides benefits not found in current systems which do not use chemically identical layers. As will be understood by one of ordinary skill in the art, in an alternative embodiment, tank 24 may be formulated to contain the blowing agent water pre-mixed with the polyol component. This may be useful to ensure adequate mixing of the blowing agent. In this embodiment, the second general step would be to stop flow from the tank 26 and begin from tank 24 while continuing from tank 28. Thus, the polyurethane mixture would contain all three components polyisocyantate, polyol, and blowing agent.

As would be understood by one of ordinary skill in the art, the mold 22 may be a two piece mold, in which case both of the cavity surfaces can be coated with the elastomeric layer 36 and foam layer 38. Also, after the foam layer 38 has been sprayed the mold 22 may be closed to allow for additional foaming of the foam layer 38 to achieve the desired density and shape.

Figure 3A:
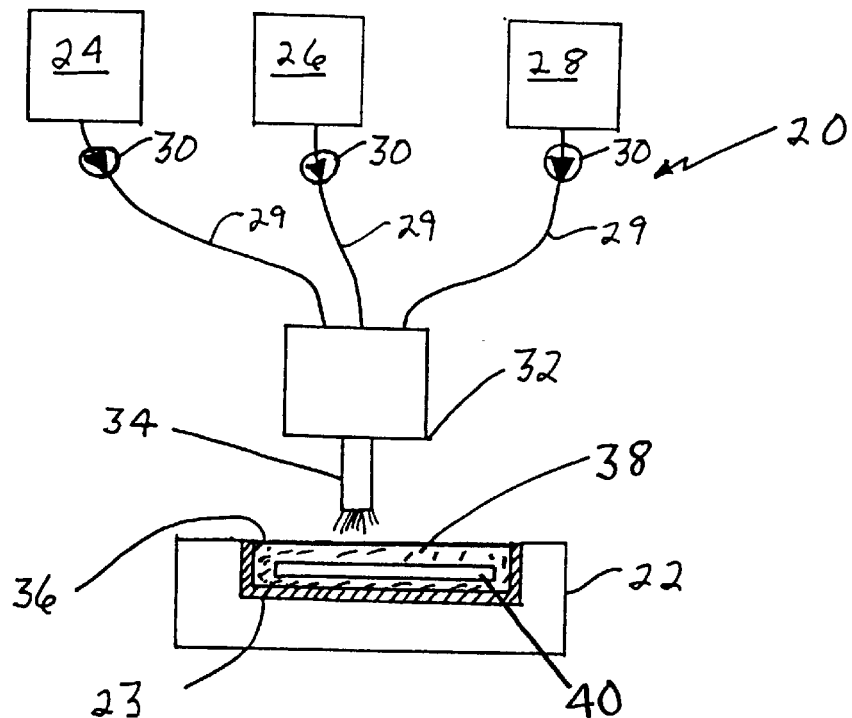
FIG. 3A is a partial cross-sectional side view of the mold after insertion of a substrate.
Figure 3B:
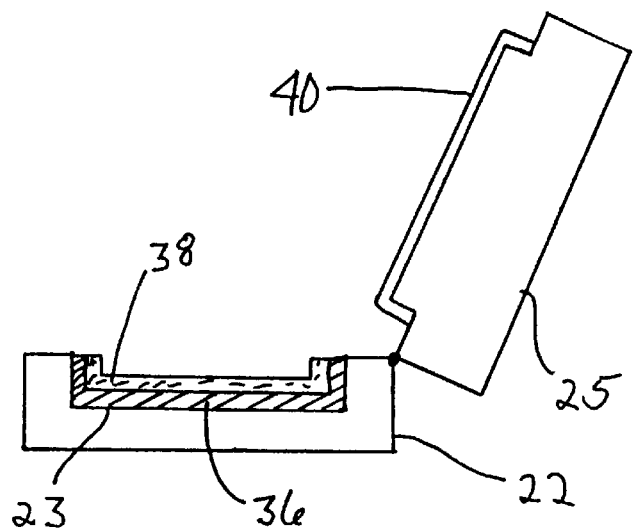
FIG. 3B is a partial cross-sectional side view of an alternative mold.

In FIG. 3A an alternative embodiment is shown wherein a substrate 40 is loaded into the mold 22 after the elastomeric layer 36 and a part of the foam layer 38 has been sprayed. Additional foam layer 38 can be applied over the substrate 40. Substrate 40 may be made of plastic, fiberboard or other materials as is known in the art. In FIG. 3B a second embodiment is shown wherein the substrate 40 is loaded onto an upper portion 25 of the mold 22. In this embodiment the upper portion 25 is closed over onto the reacting foam layer 38 and the substrate 40 is thus bonded to the foam layer 38.

Prior to applying the outer elastomeric layer 36, the surface 23 may be coated with a known mold release agent by means of a spray gun (not shown) to facilitate the eventual demolding of the resultant decorative object 42. By way of non-limiting example, the mold release agent may be a composition including silicones, soaps, waxes and/or solvents.

Alternatively, or in addition to the application of the mold release agent, the mold surface 23 may be coated with a coating composition having a predetermined color utilizing a spray gun (not shown) prior to applying the elastomeric layer 6. The coating composition, otherwise referred to herein as an in-mold coating may be selected from a variety of water and solvent borne solutions. For example, the coating may be a one or multi-component composition based on enamel or urethane coating compositions, the latter being particularly preferred.

Among the numerous commercially available coating compositions which have proven useful are those marketed under the following trade names: Protothane® which is available from Titan Finishes Corp.; Polane® which is available from Sherwin Williams, Inc.; and Rimbond® which is available from Lilly Corp., by way of non-limiting example.

Figure 4:
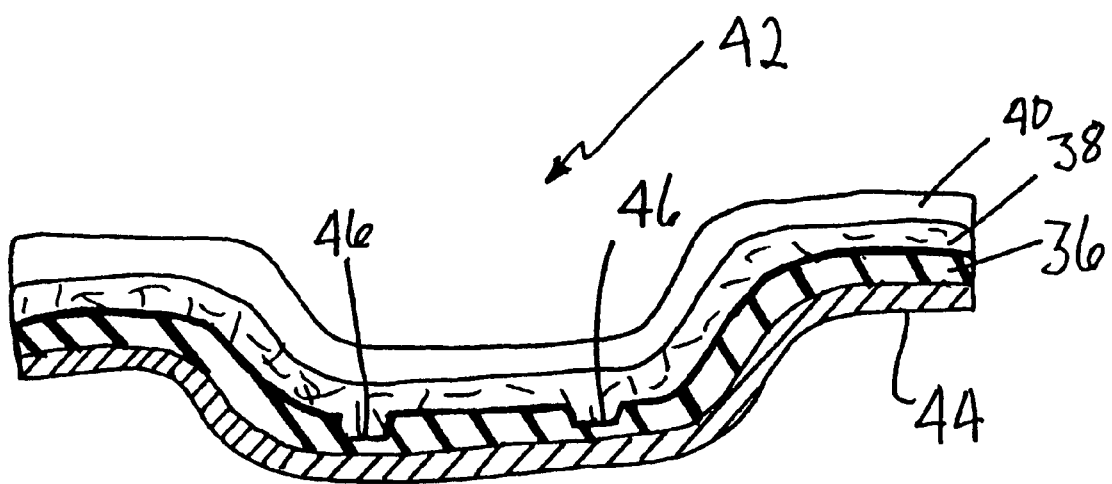
FIG. 4 is a cross-sectional view of a decorative component prepared according to the present invention.

In FIG. 4 a cross sectional view of a decorative component 42 formed according to the present invention is shown. The decorative component 42 includes an outer layer of an in-mold coating 44 that covers the outer elastomeric layer 36 and that adheres to the outer elastomeric layer 36 through the formation of a chemical bond. In the decorative component 42 shown the elastomeric layer 36 is shown as having a first thickness and a second thickness 46 wherein the second thickness is thinner than the first thickness. Because the spray nozzle 34 is preferably computer controlled, the thickness of the elastomeric layer 36 can be varied. This permits an operator to create thin portions that can be used as tear seams in the decorative component 42. For example an airbag could be positioned adjacent the thin portions, which would then function as tear seams when the airbag deploys.

The spray processing parameters of the present invention will generally fall within specific ranges to insure the quality of the resulting components. For example, it is preferred that the mold 22 and polyurethane mixture temperatures each be maintained at from about 25° C. to about 85° C., with a range of 55° C. to 70° C. being preferred. Likewise, when spraying with a high pressure metering machine, the chemical pressures as the polyurethane mixture enters the spray nozzle 34 should be between about 34 to about 150 bar, with a range of 60 to 100 bar being preferred. Alternatively, a low pressure metering machine may be used with pressures ranging from 1.5 to 20 bar, with a minimum of 3 bar preferred. The throughput is generally between 5 g/sec to about 100 g/sec, with 10 g/sec to 30 g/sec being preferred. Each of the foregoing processing parameters work best for polyurethane mixtures having viscosities up to 4000 cps at 25° C., with the viscosities more preferably ranging from 10 to about 2000 cps at 25° C.

The polyurethane mixture of the present invention includes a polyisocyanate component which may be any of the known polyisocyanates. In one of the preferred embodiments, the polyisocyanate generally corresponds to the formula R' $(NCO)_z$ wherein R' is preferably an aromatic polyvalent organic radical and z is an integer which corresponds to the valence of R' and is at least 2. Representative of the types of organic polyisocyanates contemplated herein include, for example, bis(3-isocyanatropropyl) ether, ,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisochyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, and 3,3'-dimethyldiphenylmethane-4,4'-diisocyanate; the triisocyanates such as 4,4',4"-triphenylmethane triisocyanate polymethylene polyphenylene polyisocyanate and 2,4,6-toluene triisocyanate; and the tetraisocyanates such as 4,4'-dimethyl-2,2'-5,5'-diphenylmethane tetraisocyanate. Especially useful due to their availability and properties are toluene diisocyanate, 2,4'-diphenylmethane diisocyanate, 4,4'-diphenylmethane diisocyanate, polymethylene polyphenylene polyisocyanate, and mixtures thereof.

The polyisocyanate component is preferably a modified multivalent isocyanate, i.e., product which is obtained through chemical reactions of the above diisocyanates and/or polyisocyanates. Examples include polyisocyanates containing the following groups: esters, ureas, biurets, allophanates and preferably carbodiimides, uretonimines, isocyanurate and/or urethane group containing diisocyanates and/or polyisocyanates. Individual examples are: aromatic polyisocyanates containing urethane groups, having NCO contents of from 8 to 33.6 weight percent, more preferably of from 18 to 25 weight percent, for example with diols, triols, oxyalkylene glycols, dioxyalkylene glycols, polyoxyalkyleneglycols, polyester polyols or polytetrahydrofuran having molecular weights up to 6000, modified 4,4'-diphenylmethanediisocyanate or toluenediisocyanate, whereby they are able to be employed individually or in mixtures as di- and/or polyoxyalkyleneglycols. Individual examples of the polyoxyalkyleneglycols include diethylene glycols, dipropylene glycols, polyoxyethylene glycols, polyoxypropylene glycols and polyoxypropylenepolyoxethylene glycols. Suitable also are prepolymers containing NCO groups, having NCO contents of from 8 to 25 weight percent, more preferably of from 14 to 21 percent. Also suitable are polyisocyanates containing liquid carbodiimide-uretonimine groups and/or isocyanurate rings, having NCO contents of from 8 to 33.6 weight percent, more preferably from 21 to 31 weight percent, for example, based on 4,4'-, 2,4'- and/or 2,2'-diphenylmethanediisocyanate and/or 2,4- and/or 2,6-toluenediisocyanate and preferably 2,4- and 2,6-toluenediisocyanate, as well as the corresponding isomeric mixtures 4,4'-2,4'- and 2,2'-diphenylmethanediisocyanate, as well as the corresponding isomeric mixtures for example from 4,4'- and 2,4'-diphenylmethanediisocyanates; mixtures of diphenylmethanediisocyanates and polyphenylpolymethylenepolyisocyanates (polymeric MDI) and mixtures of toluenediisocyanates and crude MDI. These quasi-prepolymers are prepared by reacting an excess of organic polyisocyanate or mixtures thereof with a minor amount of an active hydrogen containing compound as determined by the well known Zerewitinoff test as described by Kohler in Journal of the American Chemical Society, 49, 3181 (1927).

Most preferably used are: (i) polyisocyanates containing carbodiimide-uretonimine groups and/or urethane groups, from 4,4'-diphenylmethanediisocyanate or a mixture of 4,4'- and 2,4'-diphenylmethanediisocyanates having an NCO content of from 8 to 33.6 weight percent; (ii) prepolymers containing NCO groups, having an NCO content of from 8 to 27 weight percent, based on the weight of the prepolymer, prepared by the reaction of polyoxyalkylene polyols, having a functionality of from 2 to 4 and a molecular weight of from 600 to 6000 with 4,4'diphenylmethane diisocyanate or with a mixture of 4,4'- and 2,4'-diphenylmethane diisocyanates and mixtures of (i) and (ii).

The polyurethane mixture also includes a polyol component. One suitable polyol in the polyol component is a solids containing polyol including up to about 40.0 weight percent solids based on a total of all components other than the polyisocyanate component. Higher solids content tends to result in viscosities which are not suitable for sprayable polyurethane mixtures, among other perceived difficulties such as the agglomeration of the graft solids, for example.

The phrase "solids containing polyol" as used herein is intended to mean polyether polyols including organic fillers in dispersed distribution, wherein the filler material is at least in part chemically bound to the polyether. These so called solids containing polyols are preferably selected from the group consisting of graft polyols, polyisocyanate polyaddition (PIPA) polyols, polymer polyols and PHD polyols and mixtures thereof.

The graft polymer dispersions, otherwise referred to herein as graft polyols, are generally prepared by the in situ polymerization, in the polyols listed below, of an ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, 1,7-octadiene, styrene, α-methylstyrene, 2-methylstyrene, 3-methylstyrene and 4-methylstyrene, 2,4-dimethylstyrene, ethylstyrene, isopropylstyrene, butylstyrene, phenylstyrene, cyclohexylstyrene, benzylstyrene, and the like; substitute styrenes such as cyanostryrene, benzylstyrene, and the like; substitute styrenes such as cyanostyrene, nitrostyrene, N,N-dimethylaminostyrene, acetoxystyrene, methyl 4-vinylbenziate, phenoxystyrene, p-vinylbenzoate, phenoxystyrene, p-vinylphenyl oxide, and the like; the acrylic and substituted acrylic monomers such as acrylonitrile, acrylic acid, methacrylic acid, methyl acrylate, 2-hydroxyethyl acrylate, methyl methacrylate, cyclohexyl methacrylate, benzyl methacrylate, isopropyl methacrylate, octyl methacrylate, methacrylonitrile, ethyl α-acetaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide and the like; the vinyl esters, vinyl ethers, vinyl ketones, etc., such as vinyl acetate, vinyl butyrate, isopropenyl acetate, vinyl formate, vinyl acrylate, vinyl methacrylate, vinyl methoxyacetate, vinyl benzoate, vinyltoluene, vinylnaphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl methyl ketone, vinyl ethyl ketone, vinyl phosphonates such as vinyl phenyl ketone, vinyl ethyl sulfone, N-methyl-N-vinyl acetamide, N-vinylpyrrolidone, vinyl imidazole, divinyl sulfoxide, divinyl sulfone, sodium vinylsulfonate, methyl vinylsulfonate, N-vinyl-pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine and the like. Any of the known polymerizable monomers can be used and the compounds listed above are illustrative and not restrictive of the monomers suitable for use in this invention. Preferably, the monomer is selected from the group consisting of acrylonitrile, styrene and mixtures thereof.

The amount of ethylenically unsaturated monomer employed in the polymerization reaction is generally from 25 percent to 70 percent, preferably from 30 percent to 50 percent, based on the total weight of the product. The polymerization occurs at a temperature between about 25° C. and 180° C., preferably from 80° C. to 135° C.

The unsaturated polyols or macromers which may be employed in preparing the graft polymer dispersion may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, acrylic acid, acryloyl chloride, hydroxy ethyl acrylate or methacrylate and halogenated maleic acids and anhydrides, unsaturated polyhydric alcohols such as 2-butane-1,4-diol, glycerol allyl ether, trimethylolpropane allyl ether, pentaerythritol allyl ether, pentaerythritol vinyl ether, pentaerythritol diallyl ether, pentaerythritol vinyl ether, pentaerythritol diallyl ether, and 1-butane-3,4-diol, unsaturated epoxides such as 1-vinyl-cyclohexene-3,4-epoxide, butadiene monoxide, vinyl glycidyl ether (1-vinyloxy-2,3-epoxy propane), glycidyl methacrylate and 3-allyloxypropylene oxide (allyl glycidyl ether).

Illustrative polymerization initiators which may be employed are the well-known free radical types of vinyl polymerization initiators such as the peroxides, persulfates, perborates, percarbonates, azo compounds, etc. These include hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramethane hydroperoxide, diacetyl peroxide, di-α-cunyl peroxide, dipropyl peroxide, diisopropyl peroxide, isopropyl-t butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, α-methylbenzyl hydroperoxide, α-methyl-α-ethyl benzyl hydroperoxide, tetralin hydroperoxide, triphenylmethyl hydroperoxide, diphenylmethyl hydroperoxide, α,α'-azobis-(2-methyl heptonitrile), 1,1'-azo-bis(cyclohexane carbonitrile), 4,4'-azo-bis(4-cyanopentanoic acid), 2,2'-azobis(isobutyronitrile), 1-t-butylazo-1-cyanocyclohexane, persuccinic acid, diisopropyl peroxydicarbonate, 2,2'-azobis (2,4-dimethylvaleronitrile), 2-t-butylazo-2-cyano-4-methoxy-4-methylpentane, 2,2'-azobis-2methylbutanenitrile, 2-t-butylazo-2-cyanobutane, 1-t-amylazo-1-cyanocyclohexane, 2,2'-azobis(2,4-dimethyl-4-methoxyvaleronitrile, 2,2'-azobis-2-methylbutyronitrile, 2-t-butylazo-s-cyano-4-methylpentane, 2-t-butylazo-2-isocutyronitrile, to butylperoxyisopropyl carbonate and the like; a mixture of initiators may also be used. The preferred initiators are 2,2'-axobis(2-methylbutyronitrile), 2,2'-axobis (isobutyronitrile), 2,2'-axobis(s,4-demethylvaleronitrile), 2-t-butylazo-2-cyano-4-methylpentane, 2-t-butylazo-2-cyano-butane and lauroyl peroxide, Generally, from about 0.1 percent to about 10 percent, preferably from about 1 percent to about 4 percent, by weight of initiator based on the weight of the monomer will be employed in the process of the invention.

By way of non-limiting example, useful commercial graft polyol formulations include Pluracol® 1198, Pluraco® 1218, Pluracol® 1409 and Pluracol® 1413, each of which are available from BASF Corporation.

Polyaddition polyols as the phrase is used herein is intended to mean the reaction product of an isocyanate and an olamine dispersed in a polyol composition. The polyaddition polyol dispersions preferably have a viscosity in the range of about 4,000 to about 50,000 mPas. In addition to known isocyanate components such as those noted herein, the olamine component may, for example, be any one of a number of alkanolamines such as monoethanolamine, diethanolamine, dimethylethanolamine, triethanolanine, N-methylethanolamine, N-ethylethanolamine, N-butylethanolamine, N-methyldiethanolamine, N-ethyldiethanolamine, monoisopropanolamine, diisopropanolarine, triisopropanolamine, N-methylisopropanolamine, N-ethylisopropanolamine, N-propylisopropanolamine and mixtures thereof. The choice of polyol suitable for the dispersion in a vat and should be within the purview of the skilled artisans as suggested by U.S. Pat. No. 5,292,778 which is hereby incorporated by reference.

PHD polyols as the phrase is used herein is intended to mean the reaction product of an isocyanate and either a diamine or hydrazine to form polymer or polyhydrazodicarbonamide dispersions in polyol produced as a result of free radical polymerization employing olefinic monomers with polyester serving as the base. Thus, the polymer polyols include the grafted copolymer along with homopolymers of one or more olefins dispersed in unaltered polyether.

For a further understanding of the PHD polyols which are useful in accordance with the teachings of the present invention, reference can be made to the various PHD polyols disclosed in U.S. Pat. Nos. 4,089,835 and 4,260,530, both of which are fully incorporated herein by reference.

The polyol component may also include non-solids containing polyols or may be formed entirely of non-solids containing polyols. The non-solids polyols generally include one or more polyols which are prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters and polycarbonates, polyoxyalkylene polyether polyols such as the aforementioned polyoxyalkylene polyether polyols, polyhydroxy-terminated polyurethane polymers, polyhydroxyl-containing phosphorous compounds, and alkylene oxide adducts of polyhydric polythioesters, polyacetals, aliphatic polyols and thiols, ammonia and amines including aromatic, aliphatic and heterocyclic amines, as well as mixtures thereof. Alkylene oxide adducts of compounds which contain two or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used. Generally, the number average molecular weight of the polyols will vary from 400 to 10,000.

Suitable hydroxy-terminated polyesters may be used such as those prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, therephthalic acid, hemimellitic acid and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,-trimethylolethane, 1,2,6-hexanetriol, α-methyl glucoside, pentaerythritol, and sorbitol. Also included within the term "polyhydric alcohols" are compounds derived from phenol such as 2,2-bis(4-hydroxylphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Suitable initiators include both aliphatics and aromatics, such as ethylene glycol, propylene glycol, dipropylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Any suitable alkylene oxide may be used such as those disclosed above for preparing the prepolymers.

Examples of alkylene oxides include ethylene oxide, propylene oxide, butylene oxide, amylene oxide, mixtures thereof, tetrahydrofuran, alkylene oxide-tetrahydrofuran mixtures, epihalohydrins and aralkylene oxides such as styrene oxide. Polyethers which are particularly suitable include the alkylene oxide addition products of trimethylolpropane, glycerine, propylene glycol, dipropylene glycol; sucrose and blends thereof having number average molecular weights of from 1000 to 5000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thio-ether glycol.

Polyhydroxyl-containing phosphorous compounds which may be used include those compounds disclosed in U.S. Pat. No. 3,639,542. Preferred polyhydroxyl-containing phosphorous compounds are prepared from alkylene oxides and acids of phosphorous having an acid equivalency of from about 72 percent to about 95 percent.

Suitable polyacetals which may be condensed with alkylene oxides include the reaction product of formaldehyde or other suitable aldehydes with a dihydric alcohol or an alkylene oxide such as those disclosed above.

Suitable aliphatic thiols which may be condensed with alkylene oxides include alkanethiols containing at least two -SH groups such as 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Polyols having initiator molecules containing nitrogen may be used in the polyurethane mixtures of the present invention. Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3-, 2,6-, 3,4-, 2,5-, and 2,4-diaminotoluene (TDA) and mixtures of the isomers; and aliphatic amines such as methylamine, triisopropanolamine, ethylenediamine, 1,3-diaminopropane, 1,3-diaminobutane, and 1,4-diaminobutane. Polyethers having aromatic amnines as initiator molecules are also suitable.

Polyols containing ester groups can also be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542, The polyurethane mixture of the present invention also optionally may be made into an enhanced polyol component by adding to the polyol component one or more additional components selected from the group consisting of catalysts, chain extenders, surface-active agents, adhesion promoters, flame retardants, anti-oxidants, water scavengers, dyes, ultraviolet stabilizers, pigments, fillers, thixotropic agents and mixtures thereof. These additional components are well known in the art.

The use of chain extenders, while optional, is highly preferred. Examples of suitable chain extenders include those compounds having at least two functional groups bearing active hydrogen atoms such as, hydrazine, primary and secondary diamines, amino alcohols, amino acids, hydroxy acids, glycols, or mixtures thereof. Such agents will generally have a number average molecular weight of less than about 400. A preferred group of chain extending agents include ethylene glycol, 1,4-butanediol, glycerine and mixtures thereof.

While the amount of chain extenders employed is in large part determined by the anticipated end use of the decorative component, in general the polyurethane mixture of the present invention will include between about 4.0 to about 20.0% chain extender, more preferably from about 6.0 to about 15.0% and still more preferably from about 7.0 to about 10.0% by weight.

The use of catalysts is highly preferred. Examples of suitable amine-based catalysts which may be used include tertiary amines such as, for example, triethylenediamine, N-methylmorpholine, N-ethylmorpholine, diethylethanolamine, N-cocomorpholine, 1-methyl-4-dimethylaminoethylpiperizine, 3-methoxypropyldimethylamine, N,N,N'-trimethylisopropyl propylenediamine, 3-diethylaminopropyldiethylamine, dimethylbenzylamine, and the like. Other suitable catalysts are the metal based catalysts, for example, stannous chloride, dibutyltin di-2-ethyl hexanoate, stannous oxide, as well as other organometallic compounds including potassium, zinc, mercury and lead based catalysts. Other useful catalysts are disclosed in U.S. Pat. No. 2,846,408 which is hereby incorporated by reference.

Preferred catalysts however, are those commercially available amine catalysts such as DABCO® EG, DABCO® HG, DABCO® 33LV and POLYCAT® 17 which are commercially available from Air Products Corporation. Particularly suitable metal based catalysts are dioctyltin dimercaptin commercially available as FOMREZ® UL-32 catalyst and other tin catalysts and various BICAT® catalysts which are bismuth carboxylate, zinc carboxylate catalysts and mixtures thereof available from Shepherd Chemical Company. The most preferred catalyst will be a mixture of amine and metal based catalysts.

Examples of suitable UV light stabilizers which may be used include by way of nonlimiting example Tinuvin® 144, Tinuvin® 328, Tinuvin® 765, Tinuvin® 770, all of which are commercially available from Ciba Specialty Chemicals Corporation. The UV light stabilizer may be used in amounts of up to 2.0 weight % of the polyurethane mixture, with 0.25 weight % to about 0.75 weight % being preferred. Among the commercially available anti-oxidants which are considered useful are UVINUL® 2003 AO available from BASF Corporation and IRGANOX® 1010 and IRGANOX® 1098, each of which are available from Ciba Specialty Chemicals Corporation. The anti-oxidants, otherwise referred to herein as heat stabilizers, may be used in amounts of up to 2.0 weight percent of the polyurethane mixture, with 0.25 weight percent to 0.75 weight percent being preferred.

The preferred blowing agent for the present invention is water. It is most preferred that the water be combined with the polyurethane mixture at a level between 0.3 to 3.0 percent by weight based on the total weight in the polyurethane mixture containing blowing agent.

In Table 1, below, are presented two examples of the polyurethane mixtures used to form a decorative component 42. All of the amounts are in parts by weight. In example 1, the polyol component tank 26 contained all the ingredients shown in the two columns other than the water and the isocyanate A. During application of the elastomeric layer 36 the isocyanate component was added at a level of 52.2, during addition of the blowing agent water, the level was increased to 72.0. Likewise in example 2 the components other than water and isocyanate A were in the polyol component tank 26. In example 2 the isocyanate level was also increased during addition of the blowing agent.

TABLE 1

| Component | Example 1 Elastomer | Example 1 Foam | Example 2 Elastomer | Example 2 Foam |
|---|---|---|---|---|
| Isocyanate A | 52.2 | 72.0 | 50.0 | 71.0 |
| Polyol A | 70.46 | 70.46 | 38.04 | 38.04 |
| Polyol B | 13.3 | 13.3 | 30.0 | 30.0 |
| Polyol C | | | 20.0 | 20.0 |
| 1,4 butanediol chain extender | 10.0 | 10.0 | 10.0 | 10.0 |
| Bicat ® 8 catalyst | 0.04 | 0.04 | 0.06 | 0.06 |
| Dabco ® 33LV catalyst | 1.0 | 1.0 | | |
| Polycat ® 17 catalyst | | | 0.5 | 0.5 |
| Molecular sieve water scavenger | 1.0 | 1.0 | 1.0 | 1.0 |
| Plasticolors DM-45791X brown UV pigment | 4.2 | 4.2 | | |
| Reactint ® brown 2222 dye | | | 0.3 | 0.3 |
| Water | | 1.0 | | 1.0 |

Polyol A is a glycerine initiated polyether polyol including propylene oxide and ethylene oxide and has a hydroxyl number of 35. Polyol B is a dipropylene glycol initiated polyether polyol, including propylene oxide and ethylene oxide and has a hydroxyl number of 29. Polyol C is a graft polyol having 50% solids (1:1 acrylonitrile:styrene acrylonitrile) dispersed in a trimethylolpropane initiated polyether polyol.

Bicat® 8 is a bismuth neodecanoate/zinc neodecanoate catalyst including 8.0 percent bismuth and 8.0 percent zinc.

Dabco® 33LV is a 33 percent triethylenediamine, 67 percent dipropylene glycol catalyst.

Polycat® 17 is a trimethylaminopropyl ethanolamine catalyst.

Reactint® brown 2222 dye is an organic dye.

Plasticolors DM-45791X is a pigment master batch containing 60 percent Polyol B, 12 percent Tinuvin® 770DF, 12 percent Tinuvin® 328.

Tinuvin® (Ciba Geigy) 770DF is a hindered amine light stabilizer: bis(2,2,6,6-tetramethyl-4-piperidinyl) decanedioate.

Tinuvin® (Ciba Geigy) 328 is an ultraviolet light absorber: a substituted benzotriazole.

Isocyanate A is a prepolymer including 87.0 weight percent diphenylmethane diisocyanate, 8.0 weight percent dipropylene glycol, 5.0 weight percent polyether diol and having a percent NCO of 23.

We claim:

1. A method for forming a decorative component having an outer elastomeric layer that is integral with an inner foam layer, comprising the steps of:

a) forming a polyurethane mixture free of any blowing agents by combining a flow of a polyisocyanate component with a flow of a polyol component, the polyurethane mixture having a first amount of the polyisocyanate component and a first amount of the polyol component;

b) applying a layer of the polyurethane mixture onto a surface of a mold by flowing the polyurethane mixture through a spray nozzle directed toward the mold surface and forming an outer elastomeric layer on the mold surface;

c) while continuing to apply the polyurethane mixture onto the surface of the mold introducing a flow of water into the flow of the polyurethane mixture, thereby forming a polyurethane mixture containing blowing agent, and changing the first amount of the polyisocyanate component to a second amount, wherein the second amount of the polyisocyanate component is greater than the first amount of the polyisocyanate component, while continuing to spray the polyurethane mixture onto the surface of the mold;

d) continuing to direct the polyurethane mixture containing blowing agent toward the mold surface, thereby foaming the polyurethane mixture containing blowing agent and forming an inner foam layer that is integral with the outer elastomeric layer; and e) demolding the decorative component.

2. A method as recited in claim 1, wherein the polyisocyanate component comprises an aromatic polyisocyanate and step a) comprises forming the polyurethane mixture free of any blowing agents by combining the flow of the aromatic polyisocyanate component with the flow of the polyol component, the polyurethane mixture having a first amount of the polyisocyanate component and a first amount of the polyol component.

3. A method as recited in claim 1, wherein the polyol component comprises a solids containing polyol having up to 40.0 weight percent solids based on the total weight of the polyurethane mixture absent the polyisocyanate component and wherein step a) comprises forming the polyurethane mixture free of any blowing agents by combining the flow of the polyisocyanate component with a flow of solids containing polyol component, the polyurethane mixture having a first amount of the polyisocyanate component and a first amount of the solids containing polyol component.

4. A method as recited in claim 1, wherein step b) further comprises applying the layer of the polyurethane mixture onto the surface of the mold by flowing the polyurethane mixture through the spray nozzle at a total flow rate of between 5.0 grams per second to 100 grams per second and directing the polyurethane mixture toward the mold surface to form the outer elastomeric layer on the mold surface; and step c) comprises forming the polyurethane mixture containing blowing agent by introducing the flow of water into the flow of the polyurethane mixture and changing the first amount of the polyisocyanate component to the second amount, wherein the second amount of the polyisocyanate component is greater than the first amount of the polyisocyanate component, while continuing to spray the polyurethane mixture at a total flow rate of between 5.0 grams per second to 100 grams per second.

5. A method as recited in claim 1, wherein step b) further comprises applying a uniform layer of the polyurethane mixture through the spray nozzle directed toward the mold surface to form an outer elastomeric layer having a uniform thickness of between 0.2 to 3.0 mm on the mold surface.

6. A method as recited in claim 1, wherein step b) further comprises applying a non-uniform layer of the polyurethane mixture through the spray nozzle directed toward the mold surface to form an outer elastomeric layer comprising a first portion having a first thickness between 0.2 to 3.0 mm and a second portion having a second thickness wherein the second thickness is between 20% to 70% as thick as the first thickness.

7. A method as recited in claim 1, wherein step a) further comprises preparing an enhanced polyol component by combining the polyol component with a one or more additional components selected from the group consisting of catalysts, chain extenders, surface-active agents, adhesion promoters, flame retardants, anti-oxidants, water scavengers, dyes, ultraviolet stabilizers, pigments, fillers, thixotropic agents, and mixtures thereof; and step a) further comprises forming the polyurethane mixture free of any blowing agents by combining the flow of the polyisocyanate component with a flow of the enhanced polyol component, the polyurethane mixture having a first amount of the polyisocyanate component and a first amount of the enhanced polyol component.

8. A method as recited in claim 1, wherein step c) comprises forming the polyurethane mixture containing blowing agent by introducing the flow of water into the flow of the polyurethane mixture at a flow rate that establishes a water level of between 0.3 to 3.0 percent by weight base on the total weight in the polyurethane mixture containing blowing agent and changing the first amount of the polyisocyanate component to the second amount, wherein the second amount of the polyisocyanate component is greater than the first amount of the polyisocyanate component, while continuing to spray the polyurethane mixture.

9. A method as recited in claim 1, comprising the further step of pre-coating the surface of the mold with a mold release agent and step b) comprises applying the layer of the polyurethane mixture onto the mold release agent on the surface of the mold by flowing the polyurethane mixture through the spray nozzle directed toward the mold surface and forming an outer elastomeric layer on the mold release agent on the mold surface.

10. A method as recited in claim 1, comprising the further step of pre-coating the surface of the mold with an in-mold coating and step b) comprises applying the layer of the polyurethane mixture onto the in-mold coating on the surface of the mold by flowing the polyurethane mixture through the spray nozzle directed toward the mold surface and forming an outer elastomeric layer that is bonded to the in-mold coating on the mold surface so the in-mold coating adheres to the outer elastomeric layer after the demolding of the decorative component in step e).

11. A method as recited in claim 1, comprising the further step of maintaining a temperature of the polyurethane mixture and a temperature of the mold at between about 25° C. to 85° C.

12. A method as recited in claim 1, wherein step b) further comprises applying the layer of the polyurethane mixture onto the surface of the mold by flowing the polyurethane mixture to the spray nozzle at a pressure between about 34 bar to 150 bar and directing the nozzle toward the mold surface thereby forming the outer elastomeric layer on the mold surface; and step c) comprises forming the polyurethane mixture containing blowing agent by introducing the flow of water into the flow of the polyurethane mixture and changing the first amount of the polyisocyanate component to the second amount, wherein the second amount of the polyisocyanate component is greater than the first amount of the polyisocyanate component, while continuing to spray the polyurethane mixture and flowing the polyurethane mixture to the spray nozzle at a pressure between about 34 bar to 150 bar.

13. A method as recited in claim 1, wherein step b) further comprises applying the layer of the polyurethane mixture onto the surface of the mold by flowing the polyurethane mixture to the spray nozzle at a pressure between about 1.5 bar to 20 bar and directing the nozzle toward the mold surface thereby forming the outer elastomeric layer on the mold surface; and step c) comprises forming the polyurethane mixture containing blowing agent by introducing the flow of water into the flow of the polyurethane mixture and changing the first amount of the polyisocyanate component to the second amount, wherein the second amount of the polyisocyanate component is greater than the first amount of the polyisocyanate component, while continuing to spray the polyurethane mixture and flowing the polyurethane mixture to the spray nozzle at a pressure between about 1.5 bar to 20 bar.

14. A method as recited in claim 1, comprising the further step of placing a substrate adjacent the inner foam layer, the inner foam layer adhering to the substrate.

15. A method for forming a decorative component having an outer elastomeric layer that is integral with an inner foam layer, comprising the steps of:
- a) forming a polyurethane mixture free of any blowing agents by combining a flow of a polyisocyanate component with a flow of a polyol component, the polyurethane mixture having a first amount of the polyisocyanate component and a first amount of the polyol component;
- b) applying a layer of the polyurethane mixture onto a surface of a mold by flowing the polyurethane mixture through a spray nozzle directed toward the mold surface and forming an outer elastomeric layer on the mold surface;
- c) while continuing to apply the polyurethane mixture onto the surface of the mold introducing a flow of water into the flow of the polyurethane mixture at a flow rate that establishes a water level of between 0.3 to 3.0 percent by weight based on the total weight in the polyurethane mixture containing blowing agent, thereby forming a polyurethane mixture containing blowing agent, and changing the first amount of the polyisocyanate component to a second amount, wherein the second amount of the polyisocyanate component is greater than the first amount of the polyisocyanate component, while continuing to spray the polyurethane mixture onto the surface of the mold;
- d) continuing to direct the polyurethane mixture containing blowing agent toward the mold surface, thereby foaming the polyurethane mixture containing blowing agent and forming an inner foam layer that is integral with the outer elastomeric layer; and
- e) demolding the decorative component.

16. A method as recited in claim 15, wherein the polyisocyanate component comprises an aromatic polyisocyanate and step a) comprises forming the polyurethane mixture free of any blowing agents by combining the flow of the aromatic polyisocyanate component with the flow of the polyol component, the polyurethane mixture having a first amount of the polyisocyanate component and a first amount of the polyol component.

17. A method as recited in claim 15, wherein the polyol component comprises a solids containing polyol having up to 40.0 weight percent solids based on the total weight of the polyurethane mixture absent the polyisocyanate component and wherein step a) comprises forming the polyurethane mixture free of any blowing agents by combining the flow of the polyisocyanate component with a flow of solids containing polyol component, the polyurethane mixture having a first amount of the polyisocyanate component and a first amount of the solids containing polyol component.

18. A method as recited in claim 15, wherein step b) further comprises applying the layer of the polyurethane mixture onto the surface of the mold by flowing the polyurethane mixture through the spray nozzle at a total flow rate of between 5.0 grams per second to 100 grams per second and directing the polyurethane mixture toward the mold surface to form the outer elastomeric layer on the mold surface; and step c) comprises forming the polyurethane mixture containing blowing agent by introducing the flow of water into the flow of the polyurethane mixture and changing the first amount of the polyisocyanate component to the second amount, wherein the second amount of the polyisocyanate component is greater than the first amount of the polyisocyanate component, while continuing to spray the polyurethane mixture at a total flow rate of between 5.0 grams per second to 100 grams per second.

19. A method as recited in claim 15, wherein step a) further comprises preparing an enhanced polyol component by combining the polyol component with a one or more additional components selected from the group consisting of catalysts, chain extenders, surface-active agents, adhesion promoters, flame retardants, anti-oxidants, water scavengers, dyes, ultraviolet stabilizers, pigments, fillers, thixotropic agents, and mixtures thereof; and step a) further comprises forming the polyurethane mixture free of any blowing agents by combining the flow of the polyisocyanate component with a flow of the enhanced polyol component, the polyurethane mixture having a first amount of the polyisocyanate component and a first amount of the enhanced polyol component.

20. A method as recited in claim 15, comprising the further step of pre-coating the surface of the mold with a mold release agent and step b) comprises applying the layer of the polyurethane mixture onto the mold release agent on the surface of the mold by flowing the polyurethane mixture through the spray nozzle directed toward the mold surface and forming an outer elastomeric layer on the mold release agent on the mold surface.

21. A method as recited in claim 15, comprising the further step of pre-coating the surface of the mold with an in-mold coating and step b) comprises applying the layer of the polyurethane mixture onto the in-mold coating on the surface of the mold by flowing the polyurethane mixture through the spray nozzle directed toward the mold surface and forming an outer elastomeric layer that is bonded to the in-mold coating on the mold surface so the in-mold coating adheres to the outer elastomeric layer after the demolding of the decorative component in step e).

* * * * *